US012067776B1

(12) United States Patent
Allan

(10) Patent No.: US 12,067,776 B1
(45) Date of Patent: Aug. 20, 2024

(54) AUTOMATED EVALUATION OF COMBAT SPORTS EVENTS

(71) Applicant: Jabbr Technologies ApS, Copenhagen (DK)

(72) Inventor: Svejstrup Nielsen Allan, Grindsted (DK)

(73) Assignee: Jabbr Technologies ApS, Copenhagen (DK)

( * ) Notice: Subject to any disclaimer, the term of this patent is extended or adjusted under 35 U.S.C. 154(b) by 0 days.

(21) Appl. No.: 18/376,744

(22) Filed: Oct. 4, 2023

(51) Int. Cl.
*G06V 20/40* (2022.01)
*G06V 10/25* (2022.01)
*G06V 10/62* (2022.01)
*G06V 10/70* (2022.01)
*G06V 40/10* (2022.01)

(52) U.S. Cl.
CPC .............. *G06V 20/42* (2022.01); *G06V 10/25* (2022.01); *G06V 10/62* (2022.01); *G06V 10/70* (2022.01); *G06V 20/49* (2022.01); *G06V 40/10* (2022.01)

(58) Field of Classification Search
CPC ........ G06V 20/42; G06V 10/25; G06V 10/62; G06V 10/70; G06V 20/49; G06V 40/10
See application file for complete search history.

(56) References Cited

PUBLICATIONS

Piotr Stefański, Tomasz Jach, and Jan Kozak, Classification of Punches in Olympic Boxing Using Static RGB Cameras, Sep. 13, 2023, SpringerLink. (Year: 2023).*
Soudeh Kasiri, Clinton Fookes, Sridha Sridharan, and Stuart Morgan, Fine-grained action recognition of boxing punches from depth imagery, Apr. 22, 2017, Elsevier. (Year: 2017).*

* cited by examiner

*Primary Examiner* — Werner G Garner
(74) *Attorney, Agent, or Firm* — MARSHALL, GERSTEIN & BORUN LLP

(57) ABSTRACT

A computer-implemented method is provided for automated detection of action-activity and physical contact between sports events participants. Images of a field of play are captured by means of a video camera system producing at least one video stream which is digitally processed to identify human actions and any associated contact between contestants. The action-activity and contact detection happens with the usage of artificial neural network methods free of intermediate stages such as key-point and human pose-estimates.

16 Claims, 7 Drawing Sheets

AUTOMATED EVALUATION OF COMBAT SPORTS EVENTS

TECHNICAL FIELD

The present disclosure generally relates to the field of video processing technology and, more specifically, the evaluation of combat sports events, such as boxing, mixed martial arts (MMA), wrestling, kickboxing, taekwondo, Brazilian jiu jitsu (BJJ), and the like. The invention is designed for automated and/or computer-assisted evaluation of video streams that capture the fights within combat sports venues, such as rings, cages, mats, and the like. The invention is further applicable for purposes including, but not limited to, refereeing assistance systems, fight analytics, and statistics.

BACKGROUND

Quantifying combat activities performed by combatants in combat sports events, such as punches, kicks, take-downs, and the like, traditionally requires significant manual work—both live- and post-combat. Post combat quantification of combat activities is typically done using performance analysts who manually step through each frame in a video recording of a combat sports event to identify and tag all combat activities of relevance. This is a very accurate approach, but also very costly and not possible to do live as a combat sports event may contain thousands of combat activities, wherein each of the combat activities may need careful slow-motion review to be properly classified.

For quantifying combat sports events live, the industry has come to rely on human live-clickers, typically using 2 to 5 of them per combat sports event depending on the type of combat sports. The human live-clickers, rather than review combat activities in slow motion in the aftermath of a combat sports event, watch the combat sports event live like everyone else, but with a clicker devices at their disposal to capture the most critical combat activities such as strikes thrown and/or landed. Even short combat sports events typically have hundreds of combat activities, a 12-round boxing match usually includes more than 1,000 punches thrown. During exchanges, sometimes 20 or more punches may be thrown within a few seconds. Due to the fast nature of combat sports, the human clickers approach for quantifying combat activities live is generally considered very inaccurate due to limited human reaction speed and concentration. In addition, due to restrictions on manpower and budget available, typically only a small handful of the most relevant metrics are measured by the clickers. As such the human live-clickers solution has primarily been used as an entertainment tool to enrich the viewer experience when broadcasting large combat sports events, and found very limited use as a performance tool for coaches and combatants, or as a tool to judge combat sports events, due to the low accuracy and the high cost of usage.

Recently, new methods have been developed to generate statistics for combat sports events in a more accurate and more affordable way. One such approach is to add hardware sensors into the equipment of the athletes such as their gloves, see for example CN 116665104 A1, CN 116688473 A1, U.S. Ser. No. 10/124,210 B2 and U.S. Pat. No. 8,485,879 B2.

Another recently explored method is to use computer vision and deep learning approaches for identifying punch events of a video feed, see U.S. Ser. No. 11/514,677 B2. The approach taken by U.S. Ser. No. 11/514,677 B2 is to use key points and human pose estimators for human-human contact detection and activity detection. The advantage of using key point and human pose-estimators is that one may use readily available models pre-trained on large public datasets, and then fine-tune the key point or pose-estimator to a respective local application. With this approach one arrives at a reduced feature space onto which one may train a classifier to obtain reasonable results even with very limited training data.

However, key point and human pose-estimation based methods, whether 2D or 3D, in the context of combat sports and contact detection struggle with getting good accuracy, particularly if only a single video feed input is provided. This is mainly due to occlusion, self-occlusion and feature filtering. When reducing the input feature space of the source frames by creating an intermediate representation in the form of key points or pose estimations, one also filters away a lot of information that was present in the original input frame that may have been crucial to obtain the correct classification corresponding to what a performance analysts would have picked. The key point and human pose-estimation based methods may thus be beneficial in terms of needing limited training data, but they can lack in accuracy and robustness of predictions, particularly when applied to human-human contact detection in combat sports.

It is therefore a technical problem underlying the present invention to provide a method of automated evaluation for combat sports events, thereby overcoming the above-mentioned disadvantages of currently available solutions at least in part.

SUMMARY OF INVENTION

The problem is solved by the subject-matter defined in the independent claims. Advantageous modifications of embodiments of the invention are defined in the dependent claims as well as in the description and the figures.

According to a first aspect of the present invention, a method of automated evaluation of combat sports events is provided. The method may be computer-implemented. The method may comprise receiving at least one input video sequence of a combat sports event. The at least one input video sequence may be captured by at least one video camera. The method may comprise processing the at least one video sequence. The step of processing may include automatically determining at least one region of interest in the video sequence. The automatic determining may be performed by an object detection algorithm, in particular by a machine learning based object detection algorithm. The at least one region of interest may be associated with a first combatant of the combat sports event, preferably with at least one body part of the first combatant. The step of processing may include automatically determining activity data for combat activities of the first combatant in relation to a second combatant of the combat sports event. The automatic determining of activity data may be performed based on the at least one region of interest in the video sequence. The automatic determining of activity data may be performed by an activity tracking algorithm, in particular a machine learning based activity tracking algorithm. The activity data may include performed punches, in particular successfully landed punches of the first combatant. The method may comprise generating statistical data for the combat sports event based on the activity data, preferably continuously throughout a duration of the combat sports event.

A combat sport, or fighting sport, should be understood as a contact sport that usually involves one-on-one combat. The combat sports event may in particular be a boxing event. Other combat sports events for which the method may be used, are mixed martial arts (MMA), wrestling, kickboxing, taekwondo, Brazilian jiu jitsu (BJJ), and the like.

In a combat sports event, a setting aligned with the sports rules and regulations often comprises a designated area of action, which may be referred to as the ring or combat area. Contained within the ring or combat area, there are combatants being the participants of the combat sports event. Usually, two or more combatants are involved having the purpose to contest against each other. Each combatant is an active participant involved in physical actions with respect to one another. The combatants may execute movements and/or techniques in adherence with their training, strategic intentions, and the guidelines set by the respective combat sports.

In addition to the combatants, another entity within this setting may be a referee who may be assigned to regulate the combat sports event, i.e., combat actions of the combatants. The role of the referee may include observing, making decisions based on combat actions, enforcing sports rules, cautioning or penalising combatants for violations, and/or maintaining the fair and safe execution of the combat sports event. In cases of physical extremities or abrupt eventualities, the referee may invoke their authority to introduce breaks, cease the ongoing contest, declare outcomes and/or ensure the safety of the combatants.

Each of the participants of a combat sports event, i.e., the combatants and the referee, may be subject to a region of interest. As described in further detail below, a region of interest may thus for example be a combatant or referee as such, or a body part of a combatant or referee. In particular, the following examples of body parts may be relevant: A combatant's "fist", that may be protected by gloves in disciplines like boxing, serves as one of the primary contact points for performing combat actions against the counterpart combatant. A combatant's "forearm" and/or "elbow" are frequently involved in various combat actions of combat sports events, in particular for blocking incoming punches or initiating offensive moves. Lower body parts of a combatant, such as the "foot" and/or "shin" and/or "knee", are also relevant in various combat sports events, either as body parts onto which punches are not allowed, or as body parts which are used for combat actions, e.g., in kicking-based combat sports such as taekwondo or kickboxing. A combatant's "head" may also become a point of offensive or defensive combat actions in certain combat sports, like boxing. A combatant's "torso", that may include the chest and/or abdomen regions of a combatant, often is relevant as a preferred target area for punches. Further, in various different combat sports, such as in grappling sports like judo or wrestling, more additional body interactions may be relevant, e.g., involving a combatant's "shoulders", "hips", "feet" and/or the like for throwing or pinning a respective counterpart combatant.

The method may include receiving of a minimum of one video sequence from the combat sports event. The capturing of this input video sequence is facilitated, in particular performed, by one or more video cameras that may be positioned strategically around the combat area to ensure maximum coverage, thereby allowing for well-rounded input data for analysis. In other words, the method may be carried out using at least one video camera building an aspect of the hardware setup, wherein the hardware setup may further include computational means performing several steps ensuring a thorough analysis of the video sequence (s) and high-quality output generating an improved viewer experience. For instance, one or more of the method steps according to the present invention may be performed by a server and/or cloud platform and/or a local computer being placed in the nearfield of the combat sports event and/or by any other suitable computational means.

The term "video camera" may be understood as an imaging device being configured to capture a scene generating a video sequence. In particular, the video camera may be configured to capture sequences of images, which in fast succession create the effect of motion and thus a video sequence. Depending on the viewpoint of the video camera, captured video sequences include scenes of action during combat sports events, recording movement(s), expression(s), and/or the like involving an angle of view and a zoom factor of the video camera. A video camera may be equipped with advanced technology such as autofocus, image stabilization, high-definition capture ability, along with a range of frame rate options for versatile capturing.

The term "viewpoint" may be understood as a location of a respective video camera relative to the combat area or ring, preferably including a respective angle of view, more preferably a respective zoom factor and/or further settings of the respective video camera. Thus, in other words, the viewpoint of a video camera may include positioning and/or orientation of a respective video camera and optionally other settings of the respective video camera.

The term "video sequence" may essentially be a collection of successive video frames or images that, when played back, convey motion. In the nearby chronology of images that make up a video sequence, each image may be termed as a frame. The sequence of these frames captured by the video camera may encapsulate not just the physical action ongoing in the combat sports event but also the fleeting dynamics and interplay between the combatants. It may comprehensively capture the progress of the combat, including punches landed, responsive dodges, the behavior of the referee, the behavior of the crowd, and the entire match ambiance. A single video sequence can range over varying lengths, e.g., influenced by the purpose for which the sequence is to be analyzed.

The term "computer-implemented" refers to computational means, i.e., to the use of computer systems or digital technology to execute certain tasks or processes. In the context of the present invention, it pertains to the deployment of a set of algorithms and/or applications and/or digital tools used by a computer to carry out the method's objectives. Thus, computational means may be involved in various stages of the method, e.g., from the initial reception of the video sequences, to the processing and analysis of these sequences, through to the final output generation. In particular, the computational means may include, but are not limited to, object detection which may be used to determine regions of interest in a video sequence and/or machine learning techniques that may be used to interpret the interactions regions of interest, and/or video editing used to compile and output a desired video sequence.

The term "object detection algorithm" may be understood as a computational process employed for recognizing instances of objects' existence in images or frames of a video sequence, in particular for recognizing regions of interest. It may be a computer program or set of instructions that enables a computer system to distinguish and/or locate certain objects, from a bulk of perhaps otherwise unsorted visual data. An object detection algorithm, as it may be implemented in the context of the present invention, may work by scanning a video sequence and identifying segments where a predetermined "object", in particular "region or interest", is found. Examples may include a combatant of the combat sports event, a referee of the combat sports event, and/or body parts of said combatant and/or referee. An object tracking algorithm may analyze images or frames of the video sequence to determine visual patterns and/or characteristics that align with possible pre-set definitions of the object and/or region of interest.

In a more advanced implementation, an object detection algorithm could be machine learning based, which means it learns and/or evolves and/or is pre-trained from a training data set to recognize objects and/or regions of interest. Through learning from training data, the machine learning based algorithm is capable of predicting and/or recognizing objects and/or regions of interest in new, never-before-seen video sequences. Further, an object detection algorithm could be configured to track multiple objects and/or regions of interest simultaneously, detect object overlapping, recognize occlusion, and/or even categorize the detected objects and/or regions of interest into different classes. These comprehensive capabilities of object detection algorithms may contribute to the efficiency and reliability of the method according to the present invention.

The term "machine learning" may be understood as a subset of artificial intelligence that involves the construction of algorithms that allow computer systems to learn from and make predictions or decisions based on data. One form of machine learning models that may be applied in the present invention is supervised learning models. These models, trained on a labelled dataset, can be utilized in determining regions of interest. For instance, a Convolutional Neural Network (CNN), popular in image analysis tasks, can be employed to detect and localize the combatants or specific body parts in each frame of the video sequence. Alternatively or additionally to supervised learning models that require a labelled dataset, unsupervised learning models, such as clustering algorithms and/or autoencoders, can be used to uncover hidden and/or occluded patterns or structures from unlabeled data. In the context of the invention, these can be employed to learn and model the normal behavior or movement patterns of the combatants and detect anomalies based on deviations from the normal. Alternatively or additionally, semi-supervised learning models may be used, which combine the principles of both supervised and unsupervised learning. Given the large volumes of video data, labelling every frame can be a daunting task. Semi-supervised learning models can learn from a relatively small set of labelled data and a large set of unlabelled data, thereby increasing the efficiency of the training process. Alternatively or additionally, reinforcement learning models may be used. These models learn how to act based on feedback or reward signals. They could be used to train the object detection algorithm or the determination of the quality-of-view indicator, by learning from trial and error the best parameters or methods that maximize the viewer's satisfaction or engagement. Furthermore, Deep Learning models, which are a subset of machine learning representing complex, hierarchical data abstractions, could also be applied. For example, Recurrent Neural Networks (RNN) or Long Short-Term Memory (LSTM) networks, which are effective in dealing with sequential data, could be employed to analyze the sequences of movements of the combatants across the frames. The machine learning model may be designed as a classifier. By using a machine learning model, steps of the method may be performed with higher accuracy and efficiency.

It may be provided that the object tracking algorithm is based on a machine learning model which is trained by supervised machine learning or semi-supervised machine learning model, wherein the training data is a pre-labelled dataset. The training data may represent the foundational knowledge for the machine learning model comprising a collection of instances, each labelled with relevant labels and/or categories that describe the aspects of interest, e.g., for a video sequence and/or for a region of interest. The training data may encompass a database of video sequences from combat sports events being labelled with relevant information, e.g., frame by frame. For example, relevant objects and/or regions of interest may be labelled, which could be the combatants, the referee or particular body parts of the combatants or referee, such as head, fists, feet and others.

The fundamental design of the machine learning model, as described above including various implementation options, is self-evidently mutatis mutandis applicable to all other machine learning models mentioned in the following disclosure of the present invention.

The term "region of interest" may be understood as a selected subset or area within an entire dataset that is the focus for further analysis or processing. In the context of video processing and specifically for this invention, a region of interest in a video sequence may refer to a segment of the video sequence where a particularly relevant object, such as a combatant, a referee and/or one or more body parts of those are located, and/or where particularly relevant actions relating to the combat sports event occur. Given the dynamic character of combative sports events, regions of interest may move within a video sequence and are preferably to be followed within a video sequence. In other words, regions of interest may be defined variably over time and space. For example, during a boxing match, if a region of interest is determined to be around a boxer's fist, it would continually change in both position and size as the first moves and changes shape throughout the match. Thus, a region of interest may be a cropped view or portion of a video sequence, i.e., a section of video image frames.

The term "combat activities" may be understood including any physical actions carried out by participants, in particular combatants, during a combat sports event. This would typically include offensive actions such as punches, kicks, throws, and takedowns, as well as defensive actions such as blocks, parries, and evasions. Further, any body movements may be included as well as gestures and voice. For example, in a boxing match, combat activities may encompass all the jab, cross, hook, and uppercut punches thrown by the boxers, their footwork, as well as their defensive maneuvers like blocking and ducking.

The term "activity data for combat activities" may be understood as quantitative or qualitative data derived from the identified and tracked combat activities performed during the combat sports event. This includes information on the type, frequency, success rate, and/or intensity of a combat activity. For instance, in a judo match, the activity data could comprise the number and types of throws attempted, the number of successful throws, the duration of holds, escapes from holds, and other relevant combat actions.

The term "activity tracking algorithm" may be understood as a computational algorithm, often machine learning-based, designed to monitor, identify, and track the combat activities in the video sequence of the combat sports event. For instance, this may be an algorithm trained to detect a wrestler's takedown move in a wrestling match, track its execution over time, and record relevant data about its occurrence.

The term "statistical data" may be understood as a processed output data derived from the tracked activity data. This data is typically in the form of understandable statistics that summarize, describe, and/or interpret the overall performance of one or more combatants of the combat sports event. In a taekwondo match, statistical data might include the total number of kicks landed, the percentage of successful blocks, or the frequency of each type of kick used. In a boxing match, the statistical data may include statistics based on the rules and regulations for boxing, in particular the hardness and cleanness of punches and/or the defense work and/or the ring generalship and/or the effective aggression.

The term "duration" may be understood to refer to the total length of time over which the combat sports event and/or a specific round within the event, takes place. For example, in the context of a boxing match, the duration could refer to the entire match, individual rounds within the match, or even specific segments such as the time a boxer spent on the offensive versus defensive.

The automated evaluation of combat sports events as provided by the method according to the present invention, firstly, brings forth an innovative way of analyzing combat sports events, supplementing and/or supporting human judgment with machine-based evaluation to eliminate potential bias and reduce errors. Secondly, the use of video sequences as input allows for the versatility of the source data. It can accept video from any type of camera, positioned anywhere around the combat zone, enhancing the method's practical applicability. Thirdly, automatic determination of regions of interest, associated with a particular combatant, ensures that crucial events within the match are never missed, creating a reliable foundation for all subsequent analyses. The inclusion of object detection algorithms, particularly machine learning-based ones, brings a fourth advantages further described below. Fifth, if the method uses machine learning once more in determining activity data, a machine learning-based activity tracking algorithm dissects the combat activities in the regions of interest, outputting valuable information such as the type of actions, their frequency, and possibly the intensity or effectiveness of the moves. The sixth advantage lies in the specificity of the activity data determination, focussing on combat activities and performed punches. This focus enables the system to generate data that is particularly relevant to combat sports, making the output highly useful for precise performance evaluations. The seventh advantage arises from the generation of statistical data, wherein the strings of isolated activity data are synthesized into coherent, actionable insights about the combat sports event. These could range from the frequency of successful punches landed to the aggression level of a combatant, providing a comprehensive overview of the combat event. Finally, the potential to continuously evaluate and generate statistical data throughout the event marks an eighth advantage. This facilitates real-time performance monitoring and allows for dynamic evaluations that can guide strategies and decisions, offering an unprecedented level of engagement for both athletes and spectators alike. The method provided by the present invention may impactfully transform how combat sports events like boxing, judo, or wrestling are evaluated.

It may be provided that the at least one input video sequence is a plurality of input video sequences. The step of processing may, in this case, be performed on each of the plurality of video sequences. The plurality of input video sequences may be captured by a plurality of video cameras.

Each of the video sequences may offer a unique view of the combat sports event, created by their individual viewpoints, e.g., positions relative to the combat sports event, angles of view and/or zoom factor. The parallel processing of video sequences furnishes a more exhaustive record of the event, leaving fewer blind spots and gauging more nuances of the activities unfolding on the sports grounds. Instead of acting on a singular video camera feed, the object detection algorithm and subsequent method steps of the present invention may engage with each video sequence individually. By doing so, the technology allows for capturing a comprehensive picture of the event from multiple viewpoints, thereby maximizing the value of the generated statistical data.

In particular, parallel processing of more than one video camera feed is advantageous when it comes to determining the positioning and movements of the combatants. In a rapidly evolving event such as a combat sports event, a single moment can make a significant difference in the viewer's understanding and appreciation. With singular video feeds, the opportunities to capture such moments are inherently limited by the given perspective and frame. Moreover, the usage of a plurality of video cameras facilitates a higher level of fault tolerance. In case of a technical glitch, failure, or any other issue with one of the cameras, the system isn't left devoid of data to process; the feed from the remaining cameras continues to provide input, ensuring an uninterrupted performance. Further, using more than one video camera is advantageous in order to improve stability of the method according to the present invention.

It may be provided that automatically determining activity data is performed without a pose determination of the combatants. Additionally or alternatively, automatically determining activity data may be performed without defining and/or detecting key points for body parts of the combatants. Pose determination may be understood as a process in computer vision to predict the transformation of an object from a user-defined reference pose, given an image or a 3D scan. In the case of human pose estimation, major joints like knees, elbows, shoulders and wrists typically represent keypoints, based on which a "stick figure" representation of the human is generated. The subsequent processing then operates only on the stick figure model instead of the original image data.

Additionally or alternatively, automatically determining activity data may be performed based (directly) on image frames, in particular image frame pixels, of the at least one region of interest of the video sequence. The approach being free of pose determination and/or key points for determining combat activities, in particular human-human contact detection, is particularly useful with regard to required processing resources and accuracy of detection. Instead of relying on pose estimators and/or key points of body parts of combatants, it may be performed a direct machine learning-based operation, in particular a direct neural network-based classification, on the video sequences, in particular video frames of video sequences, in particular regions of interest. In order to overcome the issue of occlusion, as it is further described below, and identity confusion of the combatants and/or the referee, in the suggested approach, a set of labels, e.g., visual markers and/or other suitable indicators may be applied which allow the respective machine learning model(s) to learn to detect and classify the combat activities and associate them correctly to the respective combatant even in video sequences include heavy occlusion, e.g., overlaps between combatant(s), referee(s) and/or body parts of combatant(s) and/or referee(s). Labelling the region(s) of interest and/or the video sequences is described in further detail below.

It may be provided that the method is performed based on a plurality of machine learning models, wherein performing the method includes utilizing a sequence of at least two machine learning models, and/or wherein performing the method includes utilizing at least three machine learning models, wherein outputs of at least two of the at least three machine learning models are used as inputs for at least one of the at least three machine learning models.

In the method according to the present invention, the inclusion of multiple machine learning models includes significant enhancements. This inventive approach enables the procedure to leverage the specialized strengths of various machine learning models, resulting in a cooperative, multi-faceted operation at runtime. In particular with the use of a strategic sequence of machine learning models, there arises a unique mosaic of individual model capabilities that collectively improve the method's output quality.

For example, one machine learning model could focus on interpreting the input video sequence to determine regions of interest. This model may be specialised in object detection and tracking, and as such, ensure that the most crucial segments involving the combatants are observed with precision. Another machine learning model may focus on evaluation of combat activities, i.e., automatically determining activity data for combat activities, in particular for performed punches, of the first combatant in relation to a second combatant of the combat sports event based on the at least one region of interest in the video sequence. In order to evaluate the output of the first machine learning model, i.e., to determine activity data for combat activities included in the region(s) of interest. This model may excel in providing a profound basis for performing the step of generating statistical data preferably throughout an entire duration of the combat sports event.

One or more of the machine learning models may be implemented as a classifier. For example, the object detection algorithm may to classify different regions in the video sequence as either being a region of interest or not. A more sophisticated classifier could even categorize the type of object, i.e., body part and/or the like. Additionally or alternatively, a classifier could potentially also contribute to the determination of activity data for combat activities, classifying them into categories like "successful", "not successful" or "high level of aggression", "medium level of aggression", "low level of aggression" or "high ring generalship", "medium ring generalship", "low ring generalship" or "strong defense activity", "weak defense activity" or "hard punch", "weak punch", "clean punch" not clean punch" or any other suitable scale, based on certain predefined criteria or thresholds. For a combat sports event being a boxing event, the scale and/or criteria and/or thresholds may take into account the "10-Point Must System" including the criteria based on which a box fight is judged and/or including the possible results of a box fight.

The priority in this concept here is on the functionality aiming to have an overall good quality output and at the same time facilitating real-time operation at low processing resources. Machine learning models can be advantageously selected and sequenced based on their individual and combined competencies. Examples for further machine learning models that may be combined, are given in the disclosure further below.

It may be provided that automatically determining at least one region of interest is performed based on a determining machine learning model.

As described above, the combination of determining regions of interests and based thereon, determining activity data, is particularly advantageous and provides presents a robust quality-enhancing concept for generating desired statistical data for the respective combat sports event. Saif statistical data may support judges in taking their decision(s) and/or may support viewers in order to better understand and self-judge the combat sports activities.

The regions of interest, as identified by the object detection algorithm, include the most crucial combat actions of the combat sports event. An example of this is seen in a boxing match, where rapid first movements are of particular relevance. Here, the object detection algorithm would likely demarcate a boxer's fist, or the entire body or upper-body including fists, as a region of interest, effectively encapsulating segments of the video sequence where the boxer, being the first combatant in this case, is throwing a punch. This approach ensures that every momentous instance or the most visually engaging action isn't lost in the noise, but rather, is handled with an adequate attention. In conjunction with this, the concept of determining combat activities is a mechanism to extract what is included in respective regions of interest based.

It is important to note, in considering the principles of the present invention, that a region of interest in a video sequence can be a specific sub-sequence of the video sequence. This sub-sequence can comprise sections of video frames or images and can also span over a temporal phase of the video sequence. Thus, the region of interest isn't confined to isolated frames or moments, but can extend to include a collection or sequence of frames that together contribute towards capturing the dynamism and continuity of the combatants' actions. Using a machine learning model for determining the regions of interest and for determining the activity data is particularly advantageous and may provide an enhanced output quality. On the implementation side, it is possible to include both tasks in one machine learning model. But providing two separate machine learning models for the two tasks, wherein the output of the first machine learning model, e.g., determining the regions of interest, functions as an input for the second machine learning model, e.g., determining the activity data, is particularly advantageous due to processing resources and for facilitating a real-time experience.

Thus, it may be provided that the at least one region of interest in the video sequence is a sub-sequence of the video sequence including a time section and/or a cropped image section of the video sequence. Further, it may be provided that the at least one region of interest is marked by a bounding box representing the respective image frame section of the video sequence.

The identified region of interest in a respective video sequence may extend beyond a single frame or moment and might instead be a specific sub-sequence of the video sequence. This sub-sequence may contain both a time section and a cropped image section of the main video sequence. For instance, in a boxing match, such a sub-sequence might span several frames capturing a crucial sequence of punches or a significant defensive manoeuvre. This granular breakdown allows for the isolation of notable events within the match, enabling a more targeted analysis of the combatants' performance.

To demarcate these regions of interest, bounding boxes may be used, which graphically encapsulate the associated video image frame section representing this crucial action. For example, if a respective region of interest is a first of the first combatant, a sequence of a first combatant's first from the moment of launching the punch till the point of impact, may be encapsulated in a bounding box. The use of such bounding boxes offers an accurate, visual way to identify and track each prioritised section of the video sequence. A temporal approach captures the progression and consequences of combat activities, offering dynamic insight into not just the what, but also the when and the ensuing result. This sophistication in data capture leads to insightful statistical data generation. Additionally, the use of crop image sections and bounding boxes may ensure efficient processing. By concentrating on key areas, the system reduces the computational demands of analysing whole frames or extended sequences, resulting in lower resource usage and faster processing. Furthermore, the marking of these regions of interest with bounding boxes provides a clear visual representation of the focus areas. This visual data assists in subsequent processing stages and can be beneficial for manually reviewing the evaluation results, e.g., by judges of the combat sports event.

It may be provided that each of the at least one regions of interest are associated with one combatant, i.e., the first combatant or the second combatant; and optionally, wherein if a respective region of interest is associated with the first combatant, only activity data for combat activities of the first combatant are determined, i.e., ignoring activity data for combat activities of the second combatant.

The concept of associating each of the determined regions of interest with a specific combatant out of the participating in a combat sports event is beneficial for the sake of efficient and correct generation of activity data and statistical data. For instance, in the context of a karate tournament, the system might define a region of interest around the arm of the first combatant at the time of a strike. In this case, the region of interest is intrinsically tied or associated with the first combatant. This well-defined connection helps in accurately mapping the activities performed to the responsible combatant, eliminating any room for confusion or misattribution in the context of the fast-paced action of a combat sports event.

Moreover, the method implemented can be programmed to categorically focus its attention on the combatant linked with the outlined region of interest. This means that if a particular region of interest is associated with the first combatant, the system will exclusively track and determine activity data for that combatant. To continue with the previous example, if the region of interest associated with the first combatant is the striking arm, the system will ignore the second combatant's actions accordingly. This focused analysis can provide detailed, precise performance data on individual combatants, rather than a general overview, which can help judges to make informed decisions more easily.

The value of this focused evaluation extends to various technical advantages. Firstly, it ensures the accurate attribution of actions or moves to the right combatant, thereby eliminating chances of misinterpretation, which provides an unbiased measure for judgment or evaluation. Secondly, it simplifies the process of determining activity data and/or generating statistical data and reduces computation requirements by limiting the focus to the activities of one combatant tied specifically to the region of interest. Thirdly, the concept elevates the precision of action tracking and activity data determination, promoting the generation of granular, highly accurate statistical data for each combatant.

It may be provided that the at least one region of interest is followed within the video sequence based on at least one characteristic being included in the video sequence. The at least one characteristic may be a characteristic of content included in the video sequence and/or may be an introduced marker being introduced on purpose.

The concept of using one or more characteristics within the video sequence facilitates observing determined regions of interest. In other words, characteristics may be supportive elements of performing processing, in particular determining the region(s) of interest.

For example, in a boxing event, a characteristic may be the color of a combatant's glove. This characteristic thus may act as a guiding reference for the system to follow the motions of that body part, in this example of the combatant's glove, across successive frames or segments of the video sequence, ensuring that significant actions are accurately monitored throughout the event.

By having a characteristic to track a region of interest, actions and movements can be followed consistently and accurately across the video sequence. Whether the combatant moves quickly or subtly, the characteristic tracking ensures that every motion is captured and analyzed. Further, the use of characteristic may keep the region of interest in focus, irrespective of the complexities of the movements, the pace of the combat sports event, or the changes in camera perspectives. Even if multiple combatants are in close interaction or the camerawork shifts rapidly, the characteristic may keep the tracking steadfastly on the assigned areas. Further, this technique may simplify automatic determining of activity data. Thus, a characteristic-based approach may handle the dynamic and unpredictable nature of combat sports, efficiently managing even complex situations such as sudden direction changes, high speed actions, or overlapping movements, thereby enhancing the overall reliability and robustness of the system.

It may be provided that prior to processing the video sequences, preprocessing one or more of the at least one video sequence is performed for reducing the processing load that is needed for performing processing, Additionally or alternatively, preprocessing is performed based on a preprocessing machine learning model.

The concept of implementing a preprocessing stage prior to initiating the core video sequence processing introduces several technical advantages. The preprocessing stage may primarily prepare and/or refine the video sequence(s) for the subsequent stages of the method. This can involve activities such as filtering out noise, adjusting lighting or contrast, masking and/or padding irrelevant sections of the sequence, introducing labels to video sequences, marking sections of video sequences as sections of main combat actions, and/or reducing the resolution or frame rate for simplicity. These adjustments assist in reducing redundant and/or irrelevant information, thus streamlining the input that will be processed by the subsequent stages of the method in order to, for example, reduce the need for processing resources.

Enriching the preprocessing with a dedicated machine learning model can further enhance the efficiency of this stage. A preprocessing machine learning model can learn to detect and filter out redundant and/or irrelevant information effectively, identify the relevant sections of the video sequences, and calibrate the input video sequences optimally for the subsequent tasks.

One notable advantage of this setup is the reduction in processing load. It reduces the burden for the remaining stages of the process, providing a well-processable basis for the object detection algorithm and further tasks. Further, reducing computational resources and processing time propels overall efficiency. This advantage becomes particularly valuable for real-time and/or live broadcast scenarios, where the time taken from capture to broadcast needs to be minimized. Further, a preprocessing step can significantly improve the object detection algorithm's performance by providing cleaner, simpler input video sequences, reducing errors and improving accuracy.

It may be further provided that preprocessing includes splitting the video sequences with respect to time sections and/or cropping the video sequences with respect to image sections.

Aspects of splitting and/or cropping of video sequences are highly beneficial. The splitting of video sequences refers to the temporal segmentation of the input data. This would involve dividing the entire length of a video sequence into smaller time sections and/or chunks.

Doing so can be particularly advantageous when dealing with long-duration sporting events, simplifying the handling of video data and optimizing the processing time.

The cropping of video sequences may refer to the spatial segmentation of the input data. Much like cropping a photograph to focus on a particular subject or view, video cropping may involve selecting sections of a video frame that are relevant or of interest, disregarding the rest.

This aids in managing computational resources even more effectively. Working on smaller time sections and focussed image sections reduces the volume of data to be processed in each iterative step, thereby requiring less memory and processing power. Further, segmenting by time and space can lead to a significant reduction in processing time.

It may be provided that preprocessing includes associating at least one label with the at least one region of interest and/or with the video sequence, wherein the at least one label facilitates associating the region of interest to the first combatant, and/or wherein the at least one label provides further information based on which determining activity data, in particular statistical data, may be performed.

Labels may serve two primary purposes: firstly, to facilitate the connection of the region of interest with the first combatant or the second combatant or the referee; and secondly, to provide additional information that can enhance the determination of activity data, in particular statistical data. The labels may essentially serve as predefined classification support information or markers which help to streamline the extraction of relevant combat activity and statistical data.

Suitable labels may be any kind of labels which are detectable and processable by subsequent steps of the present method according to the present invention, i.e., the step of processing the at least one video sequence.

For example, if a respective region of interest is labelled with a label indicating that the respective region of interest is to be associated with the first combatant, for this respective region of interest, only activities of the first combatant may be considered for determining activity data and/or statistical data. In particular, if the first combatant successfully throws a punch into the face of the second combatant, the activity data may comprise this data. But if second combatant successfully throws a punch into the face of the first combatant, the activity data may not comprise this data, i.e., ignoring this activity. In other words, using labels to associate regions of interest with specific combatants provides clarity in the data analysis process, ensuring that actions are correctly attributed to the right combatant.

Further, for example, if a respective region of interest is labelled with a label indicating which combatant is the first combatant and which combatant is the second combatant, this may be particularly useful for subsequent staps of the method according to the present invention.

The provision of labels advantageously provides a seamless and accurate transition to subsequent processes like combat activity and statistical data determination. They may be computed and assigned during a detector and/or tracker stage and added to classifier input crops during a generator stage. Further, labels may also be used to encapsulate and provide additional information, enriching the data set for a more comprehensive analysis. Further, by providing labels that offer additional information, the method according to the present invention may be enabled to produce more accurate and detailed statistical data, enhancing the quality of the evaluation.

It may be provided that processing further includes automatically determining a quality-of-view indicator of the at least one determined region of interest in the video sequence. The quality-of-view indicator may be determined based at least in part on a positional relationship between the first combatant and a second combatant of the combat sports event and/or a viewpoint of a respective video camera, wherein determining the quality-of-view indicator is preferably performed based on a view evaluation machine learning model. Such quality-of-view estimation may be used in punch counting as well when having multiple cameras. This may happen at a stats fusion stage, where some angles of view may be more beneficial than other angles for a certain metric. Accordingly, if multiple cameras from different angles are run through, one of them may be selected with the best view for a specific metric measured.

Alternatively or additionally to the automatic determining of the quality-of-view indicator being based at least in part on a positional relationship between the first combatant and a second combatant of the combat sports event, the automatic determining of the quality-of-view indicator may be based at least in part on a positional relationship between at least one of the first and second combatants and a referee. Alternatively or additionally, automatic determining of the quality-of-view indicator may be based at least in part on a positional relationship between at least one of the first and second combatants and the respective video camera capturing the respective video sequence. Alternatively or additionally, automatic determining of the quality-of-view indicator may be based at least in part on a positional relationship between the referee and the respective video camera capturing the respective video sequence. Alternatively or additionally, automatic determining of the quality-of-view indicator may be based at least in part on a positional relationship between body parts of the first combatant and/or between body parts of the second combatant.

It is preferred that the automatic determining of the quality-of-view indicator may be based at least in part on a positional relationship between the first combatant and a second combatant of the combat sports event, and further on a positional relationship between at least one of the first and second combatants and the respective video camera capturing the respective video sequence. It is even more preferred that the automatic determining of the quality-of-view indicator may be based at least in part on a positional relationship between the first combatant and a second combatant of the combat sports event, and further on a positional relationship between at least one of the first and second combatants and the respective video camera capturing the respective video sequence, and further on a positional relationship between body parts of the first combatant and/or between body parts of the second combatant.

It may be further provided that if processing is performed for a plurality of video sequences showing the same specific combat activity in at least one respective region of interest, a selection of at least one reliable video sequence including a corresponding region of interest showing the specific combat activity is made based on the quality-of-view indicator, wherein automatically determining activity data is performed based on the selection.

In combat sports, one of the significant challenges that can influence the quality and clarity of video sequences is occlusion. This inevitably has an impact on evaluation, i.e., on determining activity data and/or generating statistical data. The term "occlusion", in video processing and object detection, refers to the partial or complete obstruction of one object in a video sequence by another object. This phenomenon may occur, in a combat sports event, in particular when the combatants overlap each other or a particular body part in the video sequence, resulting in obstructed views from certain camera viewpoints. Also, this phenomenon may occur if different body parts of one of the combatants overlap each other, i.e., causing self-occlusion. This is mainly due to the combatants being in constant movement, at close quarters, engaging in offensive or defensive combat actions. The occlusion may vary based on the relative positioning of the combatants, in particular relative to each other, and the viewpoint of the respective video camera. In some cases, when combatants are side-by-side, one may completely block the other from certain camera angles. In other cases, when combatants counteract each other's moves, a body part like a first may obscure the view of the other combatant's body portion, causing partial occlusion. Occlusion in combat sports poses significant challenges when applying video processing and/or object detection, in particular in order to perform evaluation.

The term "quality-of-view indicator" is to be understood in the context of occlusion, as described above. Thus, the quality-of-view indicator may essentially quantify the probable content quality of a region of interest in a video sequence. The content quality may be closely connected to the overall relevance of the region of interest in a respective video sequence thus indicating if a corresponding video sequence should be included in the output video sequence. Also, the content quality max be closely related to the degree of occlusion and/or self-occlusion, as described above. For example, an occlusion may occur if the referee is blocking the view of a respective video camera and/or if the angle with which the combatants are positioned relative to the respective video camera is not optimal. An angle where the side of each fighter is visible in a video sequence may typically comprise a higher quality of view that an angle where the front of one combatant and the back of the other combatant is visible. An aspect that may indicate whether occlusion is apparent or not, may be an angle between a line virtually drawn from a respective video camera position to the mid-point of a virtually drawn line defined between the center of mass of each combatant. If the angle at which those two lines intersect is 0°, the quality-of-view may be low, whereas 90° may indicate a view angle having a high quality-of-view. In conjunction with this, to put it in different words more relying on a viewer, the quality-of-view indicator may reveal the degree of viewer interest that a region of interest of a respective video sequence is expected to gain.

The quality-of-view indicator may be a binary value which may be 0 or 1, or may be a value defined within a predetermined scale ranging from, e.g., 0 to 1, or may be any other suitable value including the relevant information about the quality of view. In case if the quality-of-view indicator is a value within a range, a threshold may be defined which builds the boundary between "usable" and "not usable" quality-of-view indicator values. Thus, indirectly or directly, the quality-of-view indicator may carry, in particular quantify, information about the degree of occlusion.

One aspect contributing to determining a quality-of-view indicator is the positional relationship between a first combatant and a second combatant of the combat sports event. More specifically, the positional relationship may be based on the angle of view with respect to a virtual line drawn between the body mass centers of the two combatants. If this angle measures 90°, the view captures a side-to-side perspective of the combatants and of the combat actions. Thus, in this case, minimal occlusion obstructing the view occurs, the visualization and tracking of movements may be generally clear and detailed, resulting in visibility for viewers. This may correspond to a high value of the quality-of-view indicator.

Conversely, if the angle measures 0°, the view aligns directly behind or in front of the combatants. Consequently, one combatant may heavily occlude the other, obscuring the view of their movements, actions and expressions to a significant extent. This lack of visibility may correspond to a lower value of the quality-of-view indicator. Thus, even if a relevant combat action takes place, the quality-of-view is likely to be not good enough to take the respective scene of a region of interest as a basis for performing evaluation, i.e., for performing determination of activity data and/or generating statistical data.

The combination of determining quality-of-view indicators for the regions of interest and determining activity data, is particularly advantageous. With an appropriate determination of quality-of-view indicators for the regions of interest, most relevant combat actions, like throwing a punch, are determined including a rating for the quality expressing how good the respective region of interest is visible in a respective video sequence. Thus, appropriate regions of interest and video sequences may be selected based on the quality-of-view indicator in order to facilitate the step of determining activity data of the combat sports event. In other words, due to the quality-of-view indicator, a well suitable foundation for determining the activity data is established such that generating statistical data can be performed efficiently and accurately. For better understanding purposes, it is mentioned at this point, valid for the entire disclosure of the present invention, that a region of interest of a video sequence can be a sub-sequence of the video sequence, which contains the region of interest. In particular, such a sub-sequence may comprise a section of the video images or frames and/or a temporal section of the video sequence.

For instance, in a boxing match scenario, if the camera angle or the relative positioning of the boxers results in one boxer obscuring the view of the other's punch action, the quality-of-view indicator associated with this punching sequence would likely be low. On the other hand, if the identical punch action occurred with minimal to no occlusion in a different input video sequence, providing clear visibility of the punch in the video sequence, the quality-of-view indicator for this sequence would be higher. This automatically guides the determination of the activity data and/or generating the statistical data by using selected high quality input data based on the quality-of-view indicator. This advantageously enhances the quality of the statistical data generated.

It may be provided that determining activity data and/or generating statistical data is performed including performing a double-activity avoidance algorithm in order to avoid double activity tracking, wherein preferably the double-activity avoidance algorithm is based on a Non-Maximum Suppression. In addition or alternatively to Non-Maximum Suppression, which may happen within the detector(s), but may also be Temporal Non-Maximum Suppression used when having signal outputs from the classifier(s) from multiple different cameras. Conceptionally the two techniques are similar, though one may be applied to 2D images, while the other may be applied to a temporal signal time-sequence.

Determination of activity data incorporating a technique known as Non-Maximum Suppression to circumvent issues related to double activity tracking, is particularly beneficial. Non-Maximum Suppression is a technique in computer vision tasks, specifically object detection, to prune multiple overlapping bounding boxes to a single bounding box that accurately defines the position of the single object. In object detection, often the same object is identified multiple times with slightly different bounding boxes. This results in clustered boxes around the same object, which could lead to over-counting or representing a single object as multiple objects. Non-Maximum Suppression addresses this issue by considering only the bounding box with the highest confidence score and ignoring all the other overlapping boxes, thereby suppressing non-maximum values.

For example, in the context of a boxing match, where the system is using multiple machine learning models to identify and track regions associated with a combatant's fist, multiple bounding boxes may be generated around the fist. Without Non-Maximum Suppression, each of these boxes could be mistakenly counted as separate punches. However, applying Non-Maximum Suppression would suppress all boxes except the one with the highest confidence score, effectively preventing double counting of the same punch.

Therefore, by applying Non-Maximum Suppression, the method according to the present invention may avoid misrepresentation of actions and prevents the overinflation of action counts, improving the accuracy and reliability of the automated evaluation of combat sports events. The integration of Non-Maximum Suppression in the activity data determination stage offers several notable advantages. It ensures that actions are not inaccurately double counted or overestimated during the evaluation process, leading to a more accurate representation of the combatant's performance. Further, the application of Non-Maximum Suppression simplifies subsequent analytical processing by reducing overlaps and redundancies in the tracked activities. This reduces the computational load and accelerates the overall speed of the evaluation process.

There are alternatives to Non-Maximum Suppression that may be used to avoid double activity tracking in object detection tasks. Mean Shift Clustering which includes machine learning algorithm that uses cluster analysis. Mean Shift Clustering is designed to discover and measure "blobs" in a smooth density of samples. In the context of the present invention, it may be employed to identify groupings of similar activity data, effectively locating the most dense (and therefore most likely accurate) activity data in each group to prevent over-counting. Soft-Non-Maximum Suppression which is a variant of Non-Maximum-Suppression, doesn't remove any bounding boxes but reduces their confidence scores depending on their overlap with other detected boxes. This improves the overall performance and accuracy of object detection, especially for overlapping objects and at the same time keeps the data variety.

In the case when a plurality of video sequences is received, the method may comprise synchronizing the plurality of video sequences. Synchronizing may be performed based on combat activities, in particular occurring in regions of interest. Alternatively or additionally, synchronizing may be performed based on audio time offset determination between video sequences captured by different video cameras. Time audio time offset determination is an efficient approach requiring relatively low processing resources.

According to a second aspect of the present invention, a use of at least two machine learning models for performing a method according to the first aspect of the present invention is provided. It may be further provided that an output of at least one machine learning model may be used as an input for at least one different machine learning model.

According to a third aspect of the present invention, a data processing apparatus, preferably a computer device and/or a server and/or a cloud platform, comprising means for carrying out a method according to the first aspect of the present invention, is provided.

According to a fourth aspect of the present invention, a use of a plurality of video cameras in a method according to the first aspect of the present invention is provided. The video cameras may be arranged around a combat sports event.

According to a fifth aspect of the present invention, a system including a plurality of video cameras according to the fourth aspect of the present invention and including a data processing apparatus according to the third aspect of the present invention, is provided, wherein the system is configured to perform a method according to the first aspect of the present invention.

According to a sixth aspect of the present invention, a computer program or a computer-readable medium is provided, having stored thereon a computer program, the computer program comprising instructions which, when the program is executed by a computer, cause the computer to carry out a method according to the first aspect of the present invention.

All features, technical implementation details and advantages described with respect to any one of the aspects of the present invention described herein are self-evidently mutatis mutandis applicable for any one of the other aspects of the present invention and vice versa.

BRIEF DESCRIPTION OF THE DRAWINGS

The disclosure may be better understood by reference to the following drawings.

DETAILED DESCRIPTION

Figure 1:
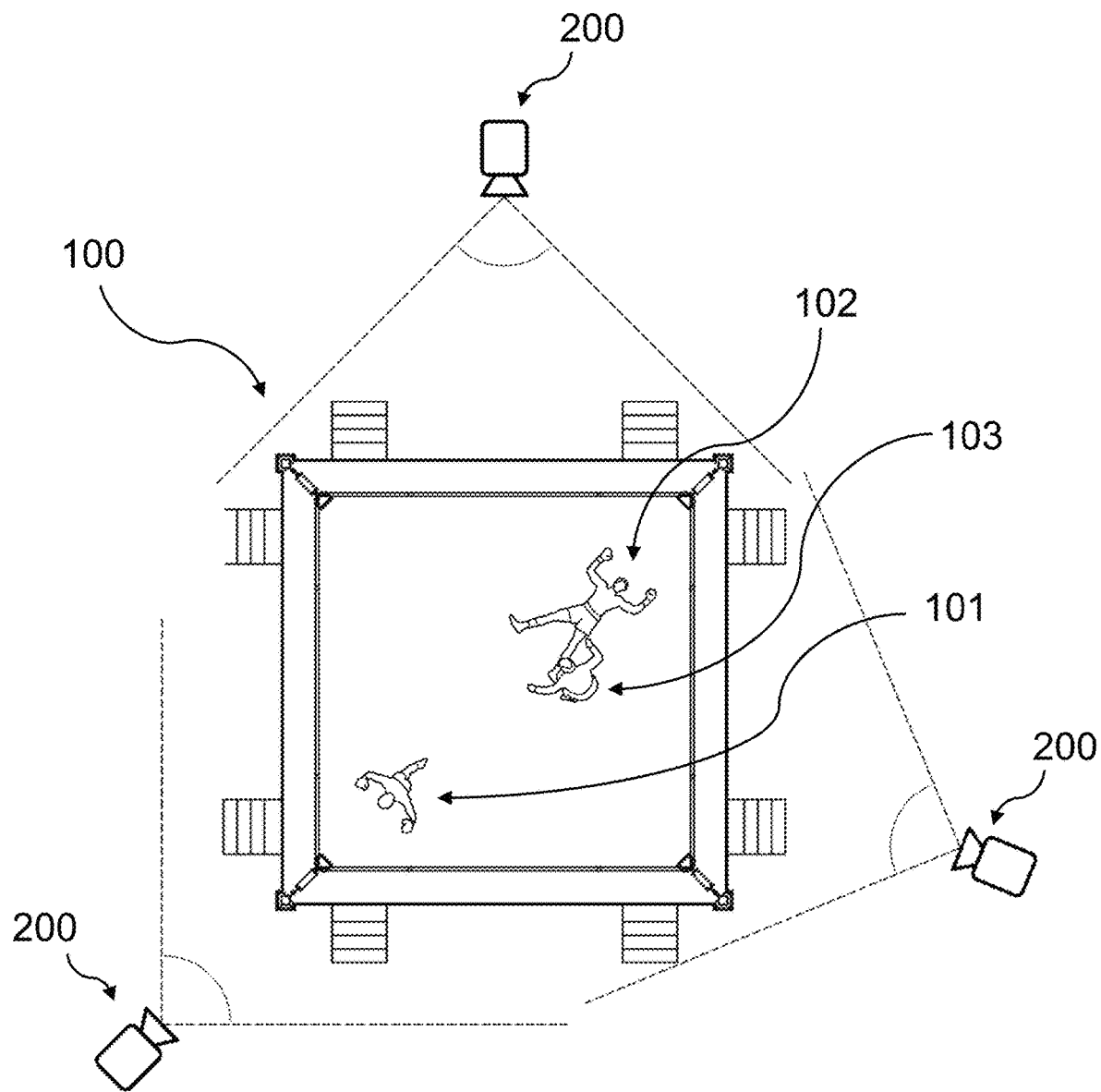
FIG. 1 is a schematic top view of a boxing ring where a method according to embodiments of the present invention is performed.

FIG. 1 schematically illustrates a combat sports event 100, in particular a boxing match in a boxing ring where a first combatant 101 and a second combatant 102 perform a combat. In the boxing ring, a referee 103 is located. Around the boxing ring, three video cameras 200 are positioned at different viewpoints to capture video sequences 201. In particular, each of the video cameras 200 provides a respective video sequence 201. This can for example be a continuous video stream in real-time.

Performing one particular exemplary embodiment of the method according to the present invention for automated video production, initially, three video sequences 201 are captured by respective video cameras 200. The three video sequences 201 are received by a processing entity, e.g., by a data processing apparatus which is configured to perform the method according to embodiments of the present invention.

Based on the processing step, a desired statistical data for the combat sports event 100, preferably continuously throughout a duration of the combat sports event 100, may be generated. The processing step is described in further detail in the following.

Processing the video sequences 201 may comprise determining, by an object detection algorithm, at least one region of interest 202 in the video sequence 201, wherein the at least one region of interest 202 is associated with one of the first or second combatants 101, 102 of the combat sports event 100, preferably with at least one body part of the first or second combatant 101, 102. Determining the at least one region of interest 202 may be performed automatically, in particular based on a machine learning model, as described in detail above.

Further, processing the video sequences 201 may comprise automatically determining activity data for combat activities, in particular for performed punches, of the first combatant 101 in relation to a second combatant 102 of the combat sports event 100 based on the at least one region of interest 202 in the video sequence 201. Determining the activity data may be performed by an activity tracking algorithm, in particular a machine learning based activity tracking algorithm, as described in detail above.

Examples for regions of interest may include the first or second combatant or their body parts, in particular their fist, forearm, elbow, foot, shin, knee, head, torso, shoulder and/or hip. Further, a region of interest may be an image section being equal to an entire video sequence captured by a video camera and/or may be a virtual camera view constructed from other region of interests in combination.

Steps of the method according to embodiments of the present invention are preferably performed by a plurality of machine learning models, in particular separately operated and/or trained machine learning models. In embodiments of the present invention, performing the method includes utilizing a sequence of at least two machine learning models. Alternatively or additionally, performing the method according to embodiments of the present invention includes utilizing at least three machine learning models, wherein outputs of at least two of the at least three machine learning models are used as inputs for at least one of the at least three machine learning models, thus creating kind of a tree structure of machine learning models. Each of the machine learning models may be adapted to their specific task, i.e., being trained to perform their task in an optimal manner.

Alternatively, according to embodiments of the present invention, the method may be performed by one singe machine-learning model configured to perform processing of video sequences 201 and to generate the output video sequence 300.

The step of automatically determining activity data may, in embodiments of the present invention, be performed without a pose determination of the combatants, and preferably without defining and/or detecting key points for body parts of the combatants, wherein optionally, automatically determining activity data may be performed based on image frames, in particular image frame pixels, of the at least one region of interest 202 of the video sequence 201.

Prior to processing the video sequences 201, preprocessing one or more of the three captured video sequences 201 may be performed for reducing the processing load that is needed for performing processing. It is preferred that preprocessing is performed based on a preprocessing machine learning model that may be one of the above-mentioned plurality of machine learning models. In embodiments of the present invention, preprocessing can include splitting the video sequences 201 with respect to time sections and/or cropping the video sequences 201 with respect to image sections, in particular according to regions of interest. Alternatively or additionally, preprocessing may include filtering out noise, adjusting lighting or contrast, masking and/or padding irrelevant sections of the video sequences 201, introducing labels to video sequences 201, marking sections of video sequences 201 as sections of main combat actions, and/or reducing the resolution or frame rate for simplicity. These adjustments assist in reducing redundant and/or irrelevant information, thus streamlining the input that will be processed by the subsequent stages of the method in order to, for example, reduce the need for processing resources.

In embodiments of the present invention, automatically determining activity data for combat activities is performed based on a machine learning model. Said machine learning model may be one of the above-mentioned plurality of machine learning models. Further, automatically determining a quality-of-view indicator may be performed in addition in order to facilitate determining activity data correctly, i.e., based on suitable video data. The quality-of-view indicator may be determined based on and/or considering a viewpoint of a respective video camera 200 and/or based on relative positional aspects of the combatants 101, 102 and optionally the referee 103. Additionally or alternatively, further relative positional aspects, as discussed in detail above, may be considered, for example relative positional aspects between body parts of a combatant 101, 102 and/or relative positional aspects with respect to the referee 103 and/or relative positional aspects with respect to the viewpoint(s) of video camera(s). The viewpoint can be the location of a respective video camera 200 relative to the combat sports event, i.e., the ring in case of a combat sports type carried out in a ring. Further, the viewpoint may include a respective angle of view, more preferably a respective zoom factor and/or further settings of the respective video camera 200. Thus, in other words, the viewpoint of a video camera 200 may include positioning and orientation of a respective video camera 200 and optionally other settings of the respective video camera 200.

In embodiments of the present invention, the method may include generating the statistical data for the combat sports event based on the activity data.

In different words, the input video sequence(s) 201 may be captured by one or more video cameras 200 placed statically on tripods. The input video sequences 201 may alternatively or additionally include data from individual isolated video camera feeds from a TV production, i.e., camera-man operated video cameras 200. The input video sequences 201 may alternatively or additionally include just a single dirty feed, i.e., a public feed streamed to viewers.

The method according to embodiments of the present invention may be configured to not get distracted by view-shifts, editing, overlay graphics etc. that's found in a dirty feed.

In the following, embodiments of the present invention are explained in different words, in particular referring to FIGS. 2a-7. With respect to the different wording the expressions may be understood in the context of that is described above, i.e., being species expressions to the generic expressions used above. For example, the following expressions may be understood as follows: The expression "fight" may be understood as species to the generic expression "combat sports event". The expression "camera system" may be understood as species to the generic expression "at least one video camera". The expression "camera" may be understood as genus expression to the species expression "video camera". The expressions "camera video" and "clip" may be understood as species to the generic expression "video sequence and/or output video sequence". The expression "fighter" may be understood as species to the generic expression "combatant". The expressions "camera position" and "view" may be understood as species to the generic expression "viewpoint". The expression "stats" may be understood as an abbreviation of the expression "statistics".

Figure 2A:
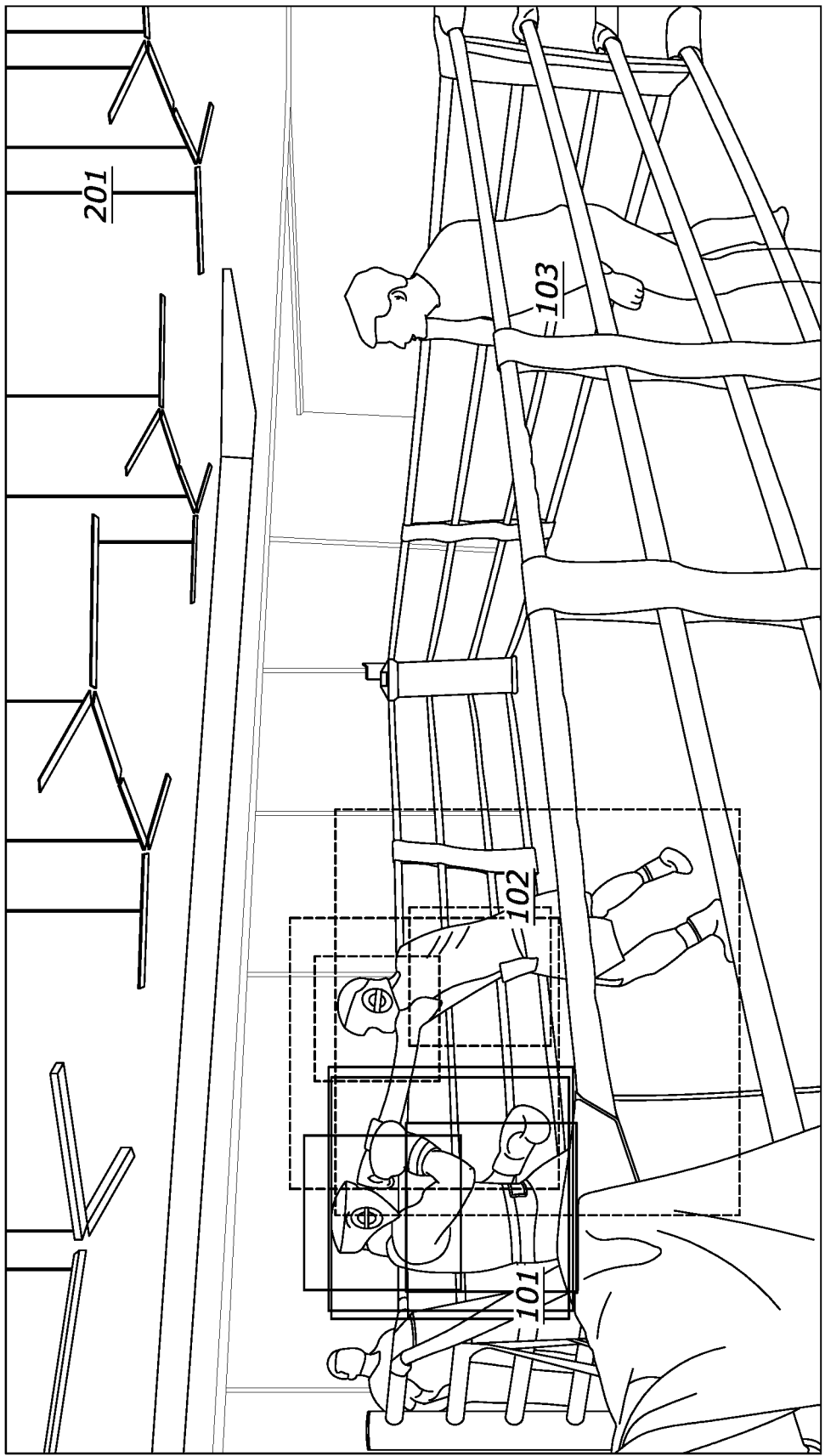
FIG. 2a shows a first exemplary snapshot of a video frame including regions of interest according to embodiments of the present invention.
Figure 2B:
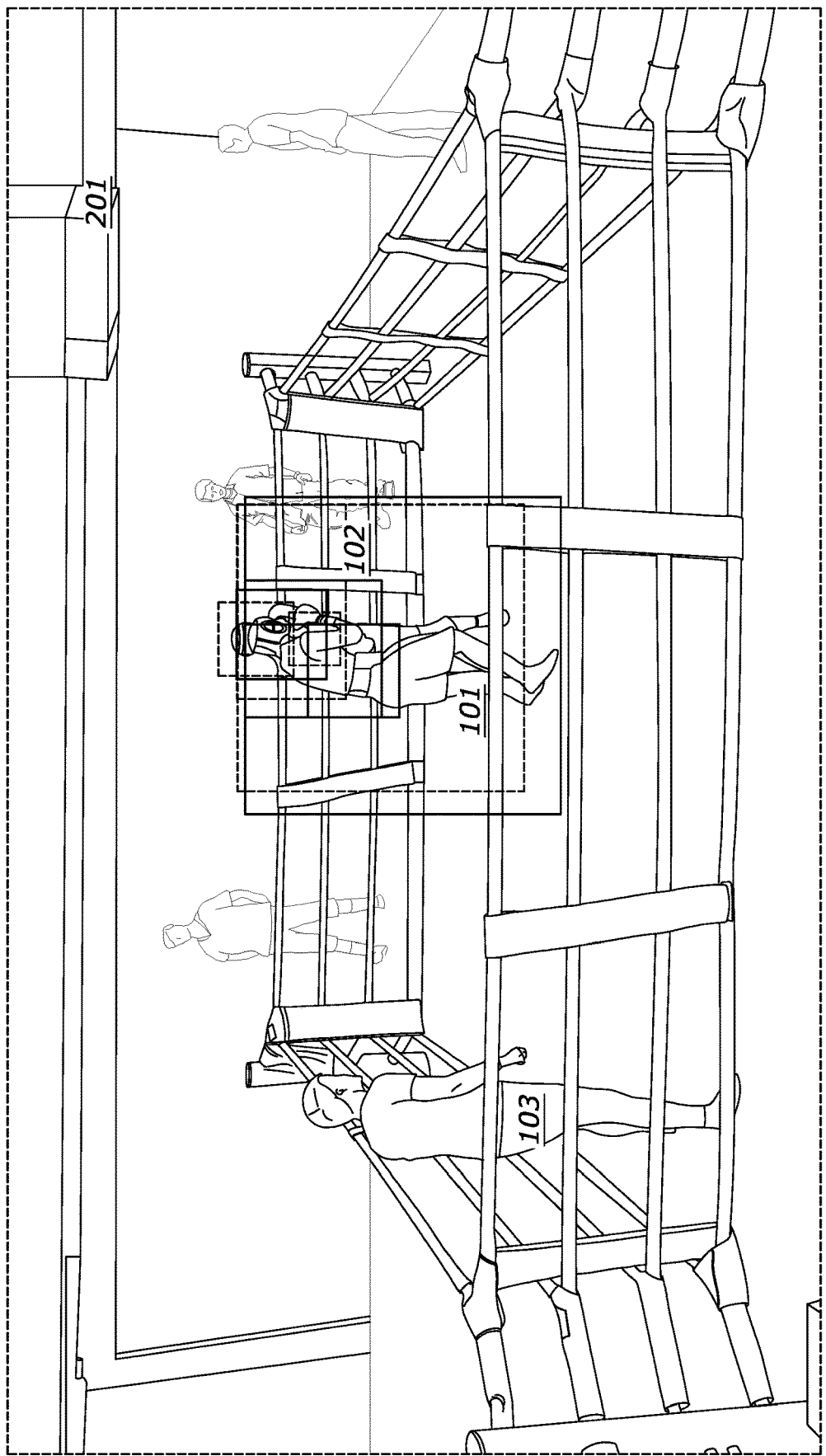
FIG. 2b shows a second exemplary snapshot of a video frame including regions of interest according to embodiments of the present invention.

FIGS. 2a and 2b show exemplary snapshots of a video frame including regions of interest according to embodiments of the present invention. In particular, the regions of interest are determined in accordance with respective virtual camera views for a red corner and a blue corner of the ring. FIG. 2a shows a left-right separation, wherein FIG. 2b shows a close-far separation. Bounding boxes have different colors indicating the allocation of the respective corner of the ring which may be red or blue. In different words, a bunch of object-of-interest boxes, i.e., bounding boxes, representing regions of interest are shown as they have been created after a generator stage (as described below), ready to feed into a classifier stage (as described below). For each combatant in this example, there is a "Fighter Full-Body", "Fighter Upper-Body", "Head-Target", and "Body-Target" region of interest. FIG. 2a shows where left-right positional indicators are passed to the classifiers, FIG. 2b shows where close-far positional indicators are used and passed to the classifiers. The term classifier may be understood as a type of machine learning model.

Figure 3:
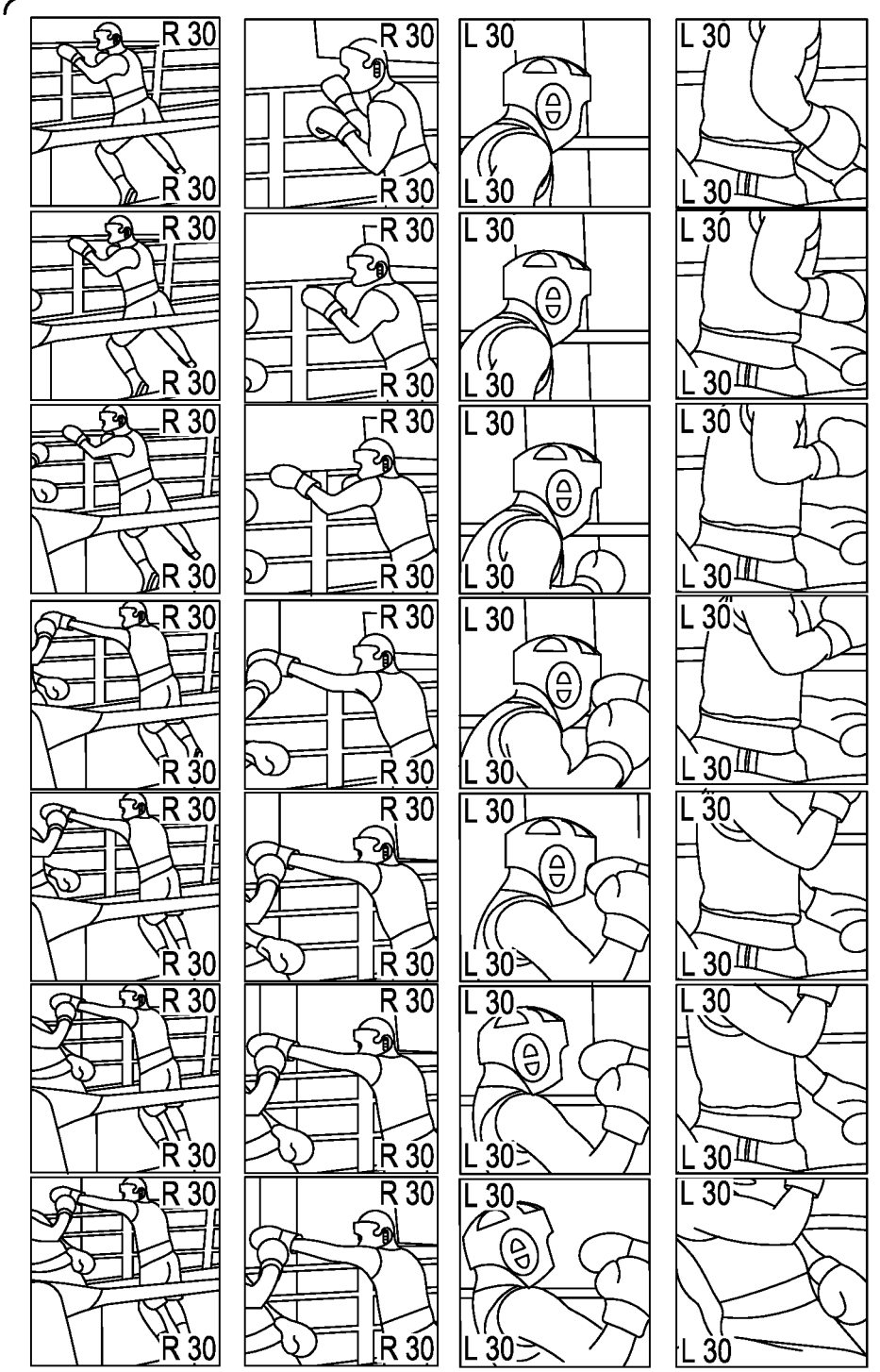
FIG. 3 shows a first exemplary sequence of video frames of cropped regions of interest according to embodiments of the present invention.

FIG. 3 shows a sequence of video frames of a cropped region of interest virtual camera view around a respective frame shown in FIG. 2a including labels, i.e., visual markers, to indicate objects of interest, i.e., regions of interest. In this particular example, the visual markers indicate a left-right positional separation for the combatants 101, 102. Thus, in other words, FIG. 3 shows a "Fighter Full-Body", "Fighter Upper-Body" for the red corner, and a "Head-Target", and "Body-Target" for the blue corner for a couple of frames before and after the frame displayed in FIG. 2a. The visual positional indicators, i.e., labels, are visual markers. R indicates to focus on the right subject of interest, i.e., combatant 102, L indicates to focus on the left subject of interest, i.e., combatant 101. The number indicates the frame-rate with which the input feed is running. Said labels help the machine learning model(s) adjust their predictions accordingly for different frame-rates.

Figure 4:
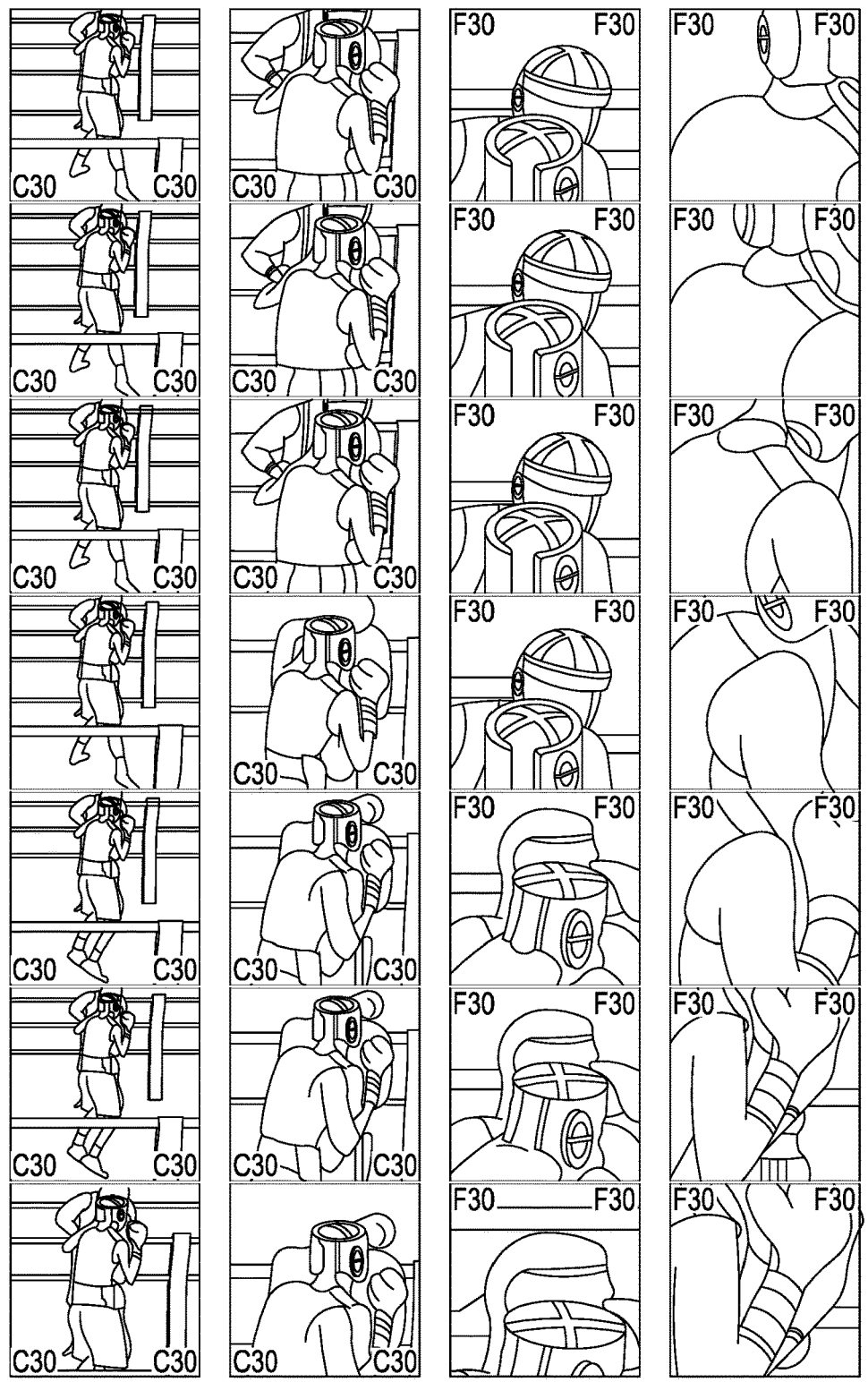
FIG. 4 shows a second exemplary sequence of video frames of cropped regions of interest according to embodiments of the present invention.

FIG. 4 shows a sequence of video frames of a cropped region of interest virtual camera view around a respective frame shown in FIG. 2b including labels, i.e., visual markers, to indicate objects of interest, i.e., regions of interest. In this particular example, the visual markers indicate a far-close positional separation for the combatants 101, 102. Thus, in other words, FIG. 3 shows a "Fighter Full-Body", "Fighter Upper-Body" for the red corner, and a "Head-Target", and "Body-Target" for the blue corner for a couple of frames before and after the frame displayed in FIG. 2b. The visual positional indicators, i.e., labels, are visual markers. C indicates to focus on the close subject of interest, i.e., combatant 101, F indicates to focus on the far subject of interest, i.e., combatant 102. The number indicates the frame-rate with which the input feed is running. Said labels help the machine learning model(s) to adjust their predictions accordingly for different frame-rates. This approach allows for reasonable prediction and counting even in cases like the one shown with heavy occlusion and self-occlusion.

Figure 5:
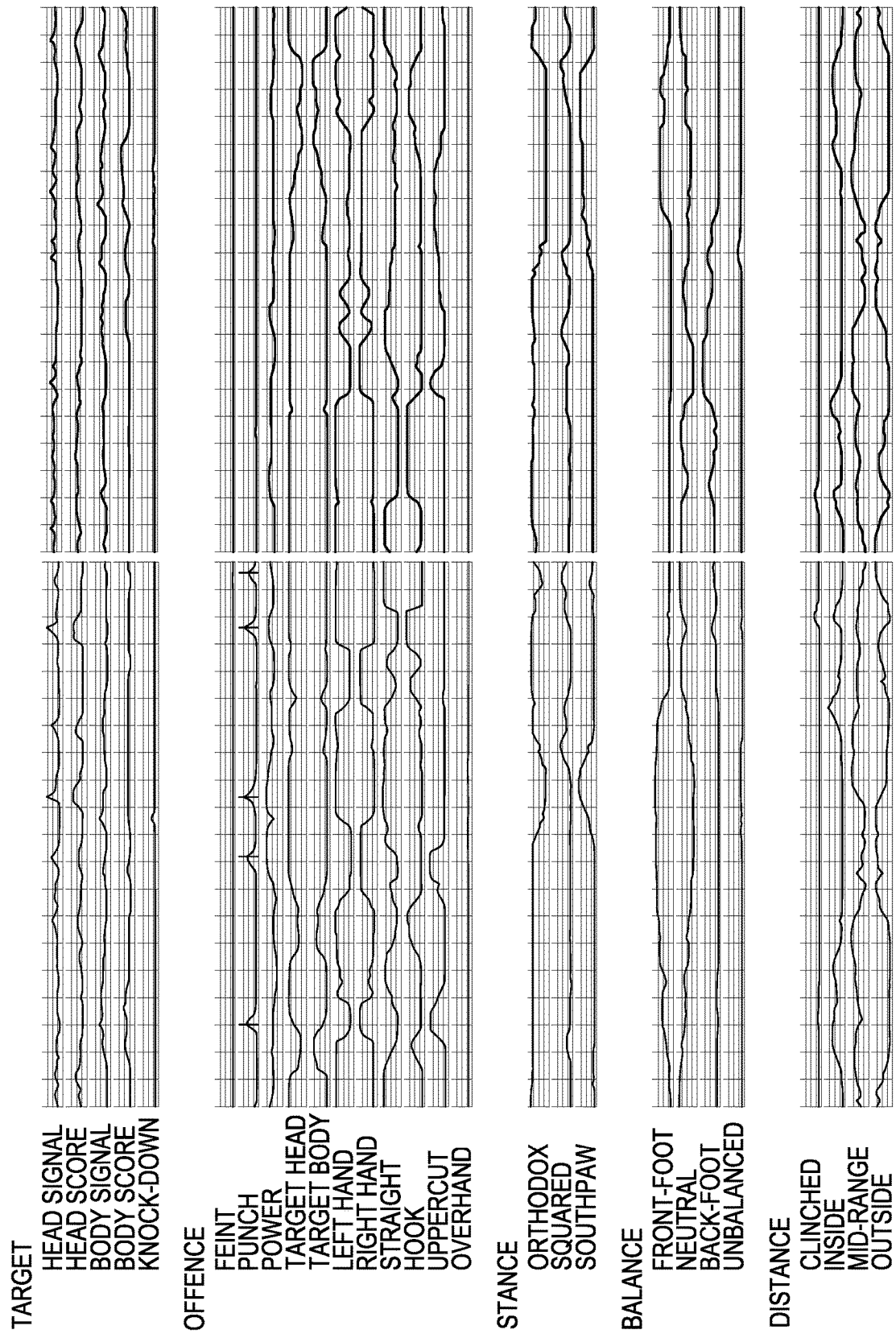
FIG. 5 shows an exemplary frame-by-frame signal output aiming to count punches according to embodiments of the present invention.

FIG. 5 shows an example of a frame-by-frame signal output from a classifier, i.e., machine learning model from the classifier stage (as described below) which is then used as an input for the combat activity determination, i.e., action activity counter and contact detection stage (as described below). The red corner (left part of the figure) has thrown 5 punches over a short span of time equivalent to 100 frames. The spikes on the offence punch graph indicates thrown punches detected. Thus, in other words, the figure shows the frame-by-frame signal output for both red and blue corner for a set of variables measured. Contact detection from the signals may be done by matching target area signal scores at the frame-index at which a punch eclipse was detected. These signal outputs exist independently for each camera, and is merged in the Fusion and Post-Processing stage using temporal Non-Max Suppression or similar. Here only a handful of metrics are shown, one could similarly measure defensive techniques such as blocks, parries, pulls, slips, ducks, rolls, clinches, etc., or guards such as high-guard, peek-a-boo, base guard, philly shell, cross guard, long guard, etc. Specific target areas may be used to capture signals better for punches landing on body parts and head parts. One could technically use the approach directly on the full body region of interest without any specific target areas of interest. This is self-evidently covered by the scope of the present disclosure.

Figure 6:
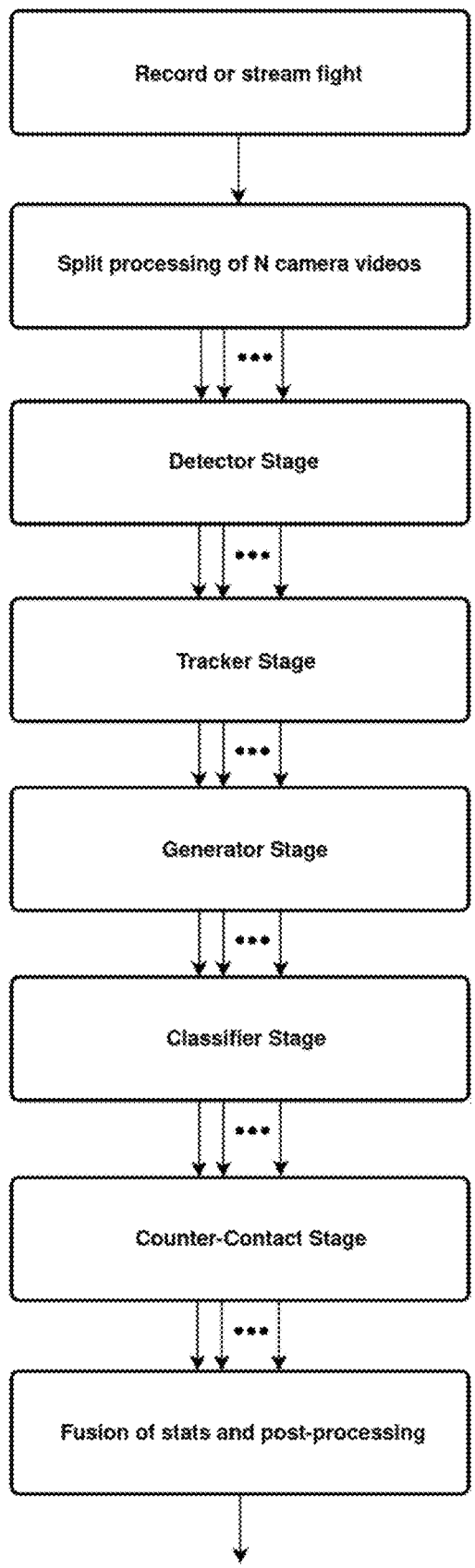
FIG. 6 is a flowchart including steps according to embodiments of the present invention.

FIG. 6 shows a flowchart including steps, i.e., stages according to embodiments of the present invention described in different words. Thus, FIG. 6 and the following, describes embodiments of the present invention in different words in order to support the overall understanding of particular features. Embodiments of the present invention may preferably include one or several of the following stages:

1. Detector Stage. This stage may be independent and the same for each input video frame coming from a video sequence. Here a set of regions of interest may be detected, as well as the relative position between each combatant within a video frame. For example, left-right, or far-close, or top-bottom. This is similar to what is shown in FIGS. 2a and 2b.
2. Tracker Stage. Here the combatants in the respective video frame and their associated regions of interest may be given an identity, i.e., red corner blue corner or similar.
3. Generator Stage. Here, a set of "virtual cameras" may be defined, wherein bounding boxes are defined around a combatant. A virtual camera may follow the full body of a respective combatant, and/or a specific target region, or another region of interest. In each frame a target area may be created, and then the current region may move towards that target with a given horizontal, vertical, and zoom speed parameter. For that, exponential averaging may be used, but any such similar method could be used for a similar effect. In addition, the generator stage may add labels, e.g., visual markers, to the video frames to indicate which identity should be considered in a given video frame. Visual markers may be used being embedded into each video frame, but alternatively it is also possible to use other indicators fed into a neural network on the side to achieve the same effect. For visual markers, it is referred to FIGS. 3 and 4.

4. Classifier Stage. In this stage, a cropped frame region from a respective region of interest of the various virtual cameras may be fed into an action-activity classifier, i.e., machine learning model. Custom classifiers may be used that operate frame-by-frame and then save some information to feed into the next frame-classification so to make fast to process, but still accurate as it is able to take into account temporal information. It is also possible, alternatively, to use a standard 13D image processing model and/or the like, similar along with a moving window implementation. However, the processing speed may be lower.

5. Counter Stage. In this stage, individual signals from each classifier may be collected and processed to count a number of punches thrown, landed, etc. For the sake of better understanding, it is referred to FIG. 5.

6. Fusion and Post-Processing Stage. In this stage, stats from multiple video cameras may be merged using temporal Non-Max Suppression and/or other post-processing methods. The method according to embodiments of the present invention may, on each camera only count what is visible from the respective camera's view, so with multiple cameras some punches may be classified as "missed" within one view, because the target region of interest, i.e., the target area for the respective punch, was occluded. But the same may be classified as "landed", i.e., successful, in another view because the target region of interest, i.e., the target area for the respective punch, was visible there to see the punch land. With multiple camera inputs the count quality will then in general be higher, though the present invention may work well providing reasonable results even just using a single video camera.

Certain embodiments of the invention may be based on using a machine learning model or machine learning algorithm. Machine learning may refer to algorithms and statistical models that computer systems may use to perform a specific task without using explicit instructions, instead relying on models and inference. For example, in machine learning, instead of a rule-based transformation of data, a transformation of data may be used that is inferred from an analysis of historical and/or training data. For example, the content of images may be analyzed using a machine learning model or using a machine learning algorithm. In order for the machine learning model to analyze the content of an image, the machine learning model may be trained using training images as input and training content information as output. By training the machine learning model with a large number of training images and/or training sequences (e.g. words or sentences) and associated training content information (e.g. labels or annotations), the machine learning model "learns" to recognize the content of the images, so the content of images that are not included in the training data can be recognized using the machine learning model. The same principle may be used for other kinds of sensor data as well: By training a machine learning model using training sensor data and a desired output, the machine learning model "learns" a transformation between the sensor data and the output, which can be used to provide an output based on non-training sensor data provided to the machine learning model. The provided data (e.g., sensor data, meta data and/or image data) may be preprocessed to obtain a feature vector, which is used as input to the machine learning model.

Machine learning models may be trained using training input data. The examples specified above use a training method called "supervised learning". In supervised learning, the machine learning model is trained using a plurality of training samples, wherein each sample may comprise a plurality of input data values, and a plurality of desired output values, i.e., each training sample is associated with a desired output value. By specifying both training samples and desired output values, the machine learning model "learns" which output value to provide based on an input sample that is similar to the samples provided during the training. Apart from supervised learning, semi-supervised learning may be used. In semi-supervised learning, some of the training samples lack a corresponding desired output value. Supervised learning may be based on a supervised learning algorithm (e.g., a classification algorithm, a regression algorithm or a similarity learning algorithm). Classification algorithms may be used when the outputs are restricted to a limited set of values (categorical variables), i.e., the input is classified to one of the limited set of values. Regression algorithms may be used when the outputs may have any numerical value (within a range). Similarity learning algorithms may be similar to both classification and regression algorithms but are based on learning from examples using a similarity function that measures how similar or related two objects are. Apart from supervised or semi-supervised learning, unsupervised learning may be used to train the machine learning model. In unsupervised learning, (only) input data might be supplied and an unsupervised learning algorithm may be used to find structure in the input data (e.g. by grouping or clustering the input data, finding commonalities in the data). Clustering is the assignment of input data comprising a plurality of input values into subsets (clusters) so that input values within the same cluster are similar according to one or more (pre-defined) similarity criteria, while being dissimilar to input values that are included in other clusters. Reinforcement learning is a third group of machine learning algorithms that may be used to train the machine learning model. In reinforcement learning, one or more software actors (called "software agents") are trained to take actions in an environment. Based on the taken actions, a reward is calculated. Reinforcement learning is based on training the one or more software agents to choose the actions such, that the cumulative reward is increased, leading to software agents that become better at the task they are given (as evidenced by increasing rewards).

Furthermore, some techniques may be applied to some of the machine learning algorithms. For example, feature learning may be used. In other words, the machine learning model may at least partially be trained using feature learning, and/or the machine learning algorithm may comprise a feature learning component. Feature learning algorithms, which may be called representation learning algorithms, may preserve the information in their input but also transform it in a way that makes it useful, often as a pre-processing step before performing classification or predictions. Feature learning may be based on principal components analysis or cluster analysis, for example.

In some examples, anomaly detection (i.e., outlier detection) may be used, which is aimed at providing an identification of input values that raise suspicions by differing significantly from the majority of input or training data. In other words, the machine learning model may at least partially be trained using anomaly detection, and/or the machine learning algorithm may comprise an anomaly detection component.

In some examples, the machine learning algorithm may use a decision tree as a predictive model. In other words, the machine learning model may be based on a decision tree. In a decision tree, observations about an item (e.g., a set of input values) may be represented by the branches of the decision tree, and an output value corresponding to the item may be represented by the leaves of the decision tree. Decision trees may support both discrete values and continuous values as output values. If discrete values are used, the decision tree may be denoted a classification tree, if continuous values are used, the decision tree may be denoted a regression tree.

Association rules are a further technique that may be used in machine learning algorithms. In other words, the machine learning model may be based on one or more association rules. Association rules are created by identifying relationships between variables in large amounts of data. The machine learning algorithm may identify and/or utilize one or more relational rules that represent the knowledge that is derived from the data. The rules may e.g. be used to store, manipulate or apply the knowledge.

Machine learning algorithms are usually based on a machine learning model. In other words, the term "machine learning algorithm" may denote a set of instructions that may be used to create, train or use a machine learning model. The term "machine learning model" may denote a data structure and/or set of rules that represents the learned knowledge (e.g., based on the training performed by the machine learning algorithm). In embodiments, the usage of a machine learning algorithm may imply the usage of an underlying machine learning model (or of a plurality of underlying machine learning models). The usage of a machine learning model may imply that the machine learning model and/or the data structure/set of rules that is the machine learning model is trained by a machine learning algorithm.

For example, the machine learning model may be an artificial neural network (ANN). ANNs are systems that are inspired by biological neural networks, such as can be found in a retina or a brain. ANNs comprise a plurality of interconnected nodes and a plurality of connections, so-called edges, between the nodes. There are usually three types of nodes, input nodes that receiving input values, hidden nodes that are (only) connected to other nodes, and output nodes that provide output values. Each node may represent an artificial neuron. Each edge may transmit information, from one node to another. The output of a node may be defined as a (non-linear) function of its inputs (e.g., of the sum of its inputs). The inputs of a node may be used in the function based on a "weight" of the edge or of the node that provides the input. The weight of nodes and/or of edges may be adjusted in the learning process. In other words, the training of an artificial neural network may comprise adjusting the weights of the nodes and/or edges of the artificial neural network, i.e. to achieve a desired output for a given input.

Alternatively, the machine learning model may be a support vector machine, a random forest model or a gradient boosting model. Support vector machines (i.e., support vector networks) are supervised learning models with associated learning algorithms that may be used to analyze data (e.g., in classification or regression analysis). Support vector machines may be trained by providing an input with a plurality of training input values that belong to one of two categories. The support vector machine may be trained to assign a new input value to one of the two categories. Alternatively, the machine learning model may be a Bayesian network, which is a probabilistic directed acyclic graphical model. A Bayesian network may represent a set of random variables and their conditional dependencies using a directed acyclic graph. Alternatively, the machine learning model may be based on a genetic algorithm, which is a search algorithm and heuristic technique that mimics the process of natural selection.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Some or all of the method steps may be executed by (or using) a hardware apparatus, such as a processor, a microprocessor, a programmable computer or an electronic circuit. Depending on certain implementation requirements, embodiments of the invention can be implemented in hardware or in software. The implementation can be performed using a non-transitory storage medium such as a digital storage medium, for example a floppy disc, a DVD, a Blu-Ray, a CD, a ROM, a PROM, and EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments of the invention provide a data carrier having electronically readable control signals, which are capable of cooperating with a programmable computer system, such that one of the methods described herein is performed.

Generally, embodiments of the invention can be implemented as a computer program (product) with a program code, the program code being operative for performing one of the methods when the computer program product runs on a computer. The program code may, for example, be stored on a machine-readable carrier. Other embodiments comprise the computer program for performing one of the methods described herein, stored on a machine-readable carrier. In other words, an embodiment of the present invention is, therefore, a computer program having a program code for performing one of the methods described herein, when the computer program runs on a computer.

A further embodiment of the invention provides a storage medium (or a data carrier, or a computer-readable medium) comprising, stored thereon, the computer program for performing one of the methods described herein when it is performed by a processor. The data carrier, the digital storage medium or the recorded medium are typically tangible and/or non-transitionary. A further embodiment of the present invention is an apparatus as described herein comprising a processor and the storage medium.

A further embodiment of the invention provides a data stream or a sequence of signals representing the computer program for performing one of the methods described herein. The data stream or the sequence of signals may, for example, be configured to be transferred via a data communication connection, for example, via the internet.

A further embodiment of the invention provides a processing means, for example, a computer or a programmable logic device, configured to, or adapted to, perform one of the methods described herein.

A further embodiment of the invention provides a computer having installed thereon the computer program for performing one of the methods described herein.

A further embodiment of the invention provides an apparatus or a system configured to transfer (e.g., electronically or optically) a computer program for performing one of the methods described herein to a receiver. The receiver may, for example, be a computer, a mobile device, a memory device, or the like. The apparatus or system may, for example, comprise a file server for transferring the computer program to the receiver.

In some embodiments, a programmable logic device (for example, a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

REFERENCE SIGNS 100 combat sport[s] event
101 first combatant
102 second combatant
103 referee
200 video camera[s]
201 video sequence[s]
202 region[s] of interest

The invention claimed is:

1. A computer-implemented method of automated evaluation of combat sports events, the method comprising:
receiving at least one input video sequence of a combat sports event captured by at least one video camera;
processing the at least one input video sequence, including:
automatically determining, by an object detection algorithm comprising a machine learning based object detection algorithm, at least one region of interest in the at least one input video sequence, wherein the at least one region of interest is associated with a first combatant of the combat sports event; and
automatically determining activity data for combat activities, in particular for performed punches, of the first combatant in relation to a second combatant of the combat sports event based on the at least one region of interest in the at least one input video sequence, wherein determining the activity data is performed by an activity tracking algorithm, in particular a machine learning based activity tracking algorithm; and
generating statistical data for the combat sports event based on the activity data,
wherein the determining the activity data and/or the generating the statistical data is performed including performing a double-activity avoidance algorithm in order to avoid double activity tracking.

2. The computer-implemented method of claim 1, wherein automatically determining the activity data is performed without a pose determination of the first combatant and the second combatant, wherein optionally, automatically determining the activity data is performed based on image frames, in particular image frame pixels, of the at least one region of interest of the at least one input video sequence.

3. The computer-implemented method of claim 1, wherein the method is performed based on a plurality of machine learning models, wherein performing the method includes utilizing a sequence of at least two machine learning models, and/or
wherein performing the method includes utilizing at least three machine learning models, wherein outputs of at least two of the at least three machine learning models are used as inputs for at least one of the at least three machine learning models.

4. The computer-implemented method of claim 1, wherein prior to the processing of the at least one input video sequence, preprocessing one or more of the at least one input video sequence is performed for reducing a processing load that is needed for performing the processing.

5. The computer-implemented method of claim 4, wherein the preprocessing includes splitting the at least one input video sequence with respect to time sections and/or cropping the at least one input video sequence with respect to image sections.

6. The computer-implemented method of claim 5, wherein the preprocessing includes associating at least one label with the at least one region of interest and/or with the at least one input video sequence, wherein the at least one label facilitates associating the at least one region of interest to the first combatant, and/or wherein the at least one label provides further information based on which the determining the activity data, in particular statistical data, may be performed.

7. The computer-implemented method of claim 4, wherein the preprocessing includes associating at least one label with the at least one region of interest and/or with the at least one input video sequence, wherein the at least one label facilitates associating the at least one region of interest to the first combatant, and/or wherein the at least one label provides further information based on which the determining the activity data, in particular statistical data, may be performed.

8. The computer-implemented method of claim 1, wherein the at least one region of interest in the at least one input video sequence is a sub-sequence of the at least one input video sequence including a time section and/or a cropped image section of the at least one input video sequence.

9. The computer-implemented method of claim 1, wherein each of the at least one region of interest are associated with one combatant, i.e., the first combatant or the second combatant; and
optionally, wherein if a respective region of interest is associated with the first combatant, only activity data for combat activities of the first combatant are determined, and the activity data for the combat activities of the second combatant are ignored.

10. The computer-implemented method of claim 1, wherein the at least one region of interest is followed within the at least one input video sequence based on at least one characteristic being included in the at least one input video sequence.

11. The computer-implemented method of claim 1, wherein the double-activity avoidance algorithm is based on a Non-Maximum Suppression.

12. The computer-implemented method of claim 11, wherein if the processing is performed for a plurality of video sequences showing the same specific combat activity in at least one respective region of interest, a selection of at least one reliable video sequence including a corresponding region of interest showing the specific combat activity is made based on a quality-of-view indicator, wherein the automatically determining the activity data is performed based on the selection.

13. The computer-implemented method of claim 1, wherein the processing further includes automatically determining a quality-of-view indicator of the at least one region of interest in the at least one input video sequence based at least in part on a positional relationship between the first combatant and the second combatant of the combat sports event and/or a viewpoint of a respective video camera.

14. The computer-implemented method of claim 1, wherein generating the statistical data for the combat sports event based on the activity data further comprises using an output of at least one machine learning model as an input for at least one other machine learning model.

15. A data processing apparatus comprising:
a processor;
a computer memory accessible by the processor;
a machine learning based object detection algorithm stored in the computer memory; and
a computer program stored in the computer memory and configured to access or implement the machine learning based object detection algorithm, wherein the computer program, when executed by the processor, causes the processor to:
  receive at least one input video sequence of a combat sports event captured by at least one video camera;
  process the at least one input video sequence, including:
    automatically determining, by an object detection algorithm comprising the machine learning based object detection algorithm, at least one region of interest in the at least one input video sequence, wherein the at least one region of interest is associated with a first combatant of the combat sports event; and
    automatically determining activity data for combat activities, in particular for performed punches, of the first combatant in relation to a second combatant of the combat sports event based on the at least one region of interest in the at least one input video sequence, wherein the determining the activity data is performed by an activity tracking algorithm, in particular a machine learning based activity tracking algorithm; and
  generate statistical data for the combat sports event based on the activity data,
  wherein the determining the activity data and/or the generating the statistical data is performed including performing a double-activity avoidance algorithm in order to avoid double activity tracking.

16. A non-transitory computer-readable medium having stored thereon a computer program, the computer program comprising instructions which, when the program is executed by a computer, cause the computer to:
receive at least one input video sequence of a combat sports event captured by at least one video camera;
process the at least one input video sequence, including:
  automatically determining, by an object detection algorithm comprising a machine learning based object detection algorithm, at least one region of interest in the at least one input video sequence, wherein the at least one region of interest is associated with a first combatant of the combat sports event; and
  automatically determining activity data for combat activities, in particular for performed punches, of the first combatant in relation to a second combatant of the combat sports event based on the at least one region of interest in the at least one input video sequence, wherein the determining the activity data is performed by an activity tracking algorithm, in particular a machine learning based activity tracking algorithm; and
generate statistical data for the combat sports event based on the activity data,
wherein the determining the activity data and/or the generating the statistical data is performed including performing a double-activity avoidance algorithm in order to avoid double activity tracking.

* * * * *